United States Patent [19]

Wade

[11] 4,453,527
[45] Jun. 12, 1984

[54] INSULATED DIESEL ENGINE COMBUSTION CHAMBER

[75] Inventor: Wallace R. Wade, Farmington Hills, Mich.

[73] Assignee: Ford Motor Company, Dearborn, Mich.

[21] Appl. No.: 334,956

[22] Filed: Dec. 28, 1981

[51] Int. Cl.³ .................................. F02B 75/08
[52] U.S. Cl. ........................ 123/669; 123/193 P; 123/193 H; 123/193 CH
[58] Field of Search .............. 123/668, 669, 193 R, 123/193 P, 193 H, 193 CH

[56] References Cited

U.S. PATENT DOCUMENTS

| | | | |
|---|---|---|---|
| 10,759 | 8/1886 | Daimler | 123/668 |
| 1,755,578 | 4/1930 | Goldsborough | 123/668 |
| 1,799,860 | 4/1931 | Schrader | 123/193 CH |
| 1,835,971 | 12/1931 | Schattanek | 123/668 |
| 1,904,070 | 4/1933 | Morgan | 123/668 |
| 3,408,995 | 11/1968 | Johnson | 123/668 |
| 4,018,195 | 4/1977 | Bandrowski | 123/193 H |
| 4,106,444 | 8/1978 | Deutschmann et al. | 123/193 H |
| 4,242,948 | 1/1981 | Stang et al. | 123/193 P |
| 4,328,772 | 5/1982 | Heydrich et al. | 123/669 |

FOREIGN PATENT DOCUMENTS 522113 6/1940 United Kingdom ............ 123/193 P

Primary Examiner—Craig R. Feinberg
Attorney, Agent, or Firm—Robert E. McCollum; Clifford L. Sadler

[57] ABSTRACT

A diesel engine is provided with extenders or spacers attached to those portions of the cylinder block, cylinder head and piston that define the combustion chamber, the extenders being of substantial axial extent and of low thermal conductivity to insulate the components to which they are attached from the combustion chamber while redefining the combustion chamber surfaces.

1 Claim, 1 Drawing Figure

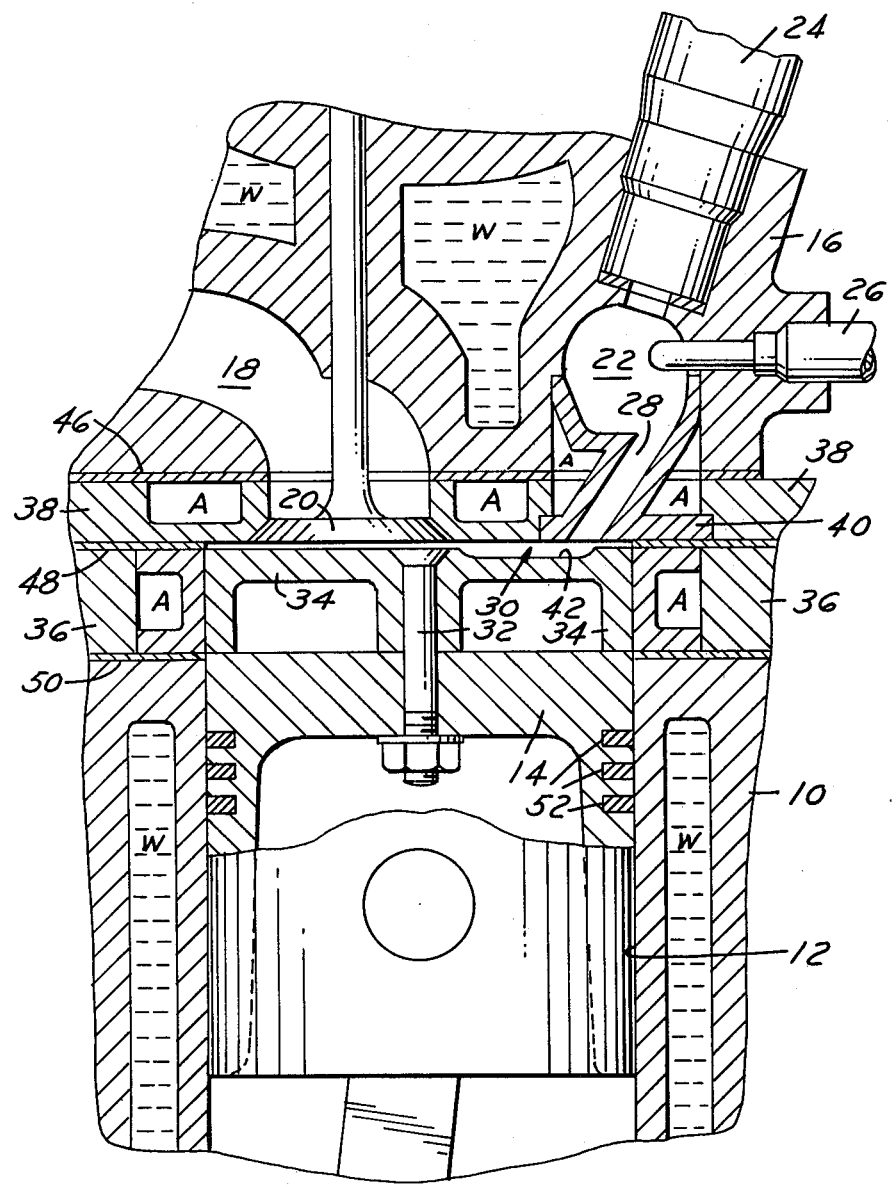

INSULATED DIESEL ENGINE COMBUSTION CHAMBER

This invention relates in general to the design of a diesel engine combustion chamber. More particularly, it relates to one in which the engine component surfaces defining the combustion chamber, such as those of the cylinder block, cylinder head and piston, are provided with extensions of low thermal conductivity to retard the passage of heat from the combustion chamber and thereby provide significant reductions in particulate emissions from the engine.

Insulating portions or components of engine combustion chambers is not new per se. For example, a number of patents, such as U.S. Pat. Nos. 1,835,971, Schattanek; 3,408,995, Johnson; 1,904,070 Morgan; 1,755,578, Goldsboro; and 10,759 Daimler, show insulation applied to the piston and mating cylinder head surfaces for protection against the heat of combustion. However, none show extensions that project from the cylinder head, cylinder block and/or piston in the cooperative manner to be described of low thermal conductivity to confine the heat to the combustion chamber and thereby reduce or eliminate particulate emissions.

Schrader, U.S. Pat. No. 1,799,869 does show an additional spacer type extension of the cylinder block. However, in this case, the extension is provided merely to afford access to the piston rings when the spacer and the cylinder head are removed, without also necessitating the removal of the piston from the assembly. There is no comparable extension of the piston or cylinder head in the manner to be described.

It is an object of the invention, therefore, to provide an engine constructed with axial extensions or spacers fixed to the engine piston, cylinder block, and cooperating cylinder head members, constructed of low thermal conductivity material, the piston and cylinder block extensions being of approximately the same axial extent or depth to be interfitting, to maintain the heat of combustion within the combustion chamber and thereby eliminate or reduce the deposit of particulates therein.

Other objects, features and advantages of the engine will become more apparent upon reference to the succeeding detailed description thereof, and to the drawing containing a single FIGURE schematically illustrating a cross-sectional view of a portion of a diesel engine defining a combustion chamber.

The diesel engine shown in the FIGURE includes a cylinder block 10 having a cylinder bore 12 slideably containing a reciprocable piston 14. The engine also includes the usual cylinder head 16 formed with conventional intake and exhaust passages 18 (only one shown controlled by a poppet type valve 20). Also included is a precombustion chamber 22 into which is injected fuel by an injector indicated at 24, the mixture being ignited by a glow plug 26. Chamber 22 is connected by a throat passage 28 to a dish-shaped combustion chamber 30 that is defined by surfaces of members to be described. Both the cylinder block and head are formed with the usual water cooling passages W.

As thus far described, the diesel engine is conventional. Further details of construction and operation other than those relating to the invention are not given since they are known and believed to be unnecessary for an understanding of the invention. Turning to the invention, therefore, as stated previously, it is an object of the invention to provide adjacent the combustion chamber members of low thermal conductivity that will retain the heat of the combustion chamber and effectively eliminate transmission of heat to the piston, cylinder block and cylinder head to reduce particulates in the combustion chamber and thereby reduce particulate emission into the atmosphere.

To accomplish this objective, the cylinder block, the piston top and the cylinder head each are provided with axial extensions of a depth that space the block and cylinder head per se from one another, the extensions being members of low thermal conductivity. More specifically, as shown in the FIGURE, secured to piston 14 by a single bolt 32 is an annular extension 34 of the same diameter as piston 14 and of a depth to extend axially upwardly a substantial amount as indicated. The cylinder block is provided with an axial extension 36 of a depth mating with that of piston extension 34. The cylinder head 16 also is provided with an annular extension 38, with openings as shown, for insertion of the prechamber assembly and the intake and exhaust valve seats. The prechamber throat passage and the valve ports in this case are extended to mate with the extension of the cylinder head surfaces. In this case, the top surface of piston extension 34 is provided with the depression 42 defining the combustion chamber 30.

It will be clear that the axial extensions of the piston, cylinder block and cylinder head will separate or space these components from each other in a manner to retard or eliminate the outflow of heat from the combustion chamber and adjacent surfaces into each of the respective components. The usual gaskets 46, 48 and 50 are provided to separate the extensions or spacers, which are made of a ceramic material of low thermal conductivity. If desired, the extensions or spacers could be made of high temperature alloys in which case suitable air gap pockets A would be provided in each of the extensions for heat insulation to reduce the available path for heat flow from the combustion chamber.

When the heat outflow from the combustion chamber is reduced in the manner described above, the combustion gases during the expansion stroke will be maintained at higher temperatures. This will promote the oxidation of particulates since oxidation rates of particulate emissions are increased significantly as the temperature level is raised.

From the above, therefore, it will be seen that the invention provides a diesel engine combustion chamber that is insulated with low thermal conductivity spacers or extensions projecting from each of the combustion chamber components in a particular nested manner to effectively reduce heat flow from the chamber.

The extended piston top 34 will retard or prevent the flow of heat into the piston and from the combustion chamber. The cylinder block extension 36 will retard or prevent the flow of heat into the cylinder block 10 and out of the combustion chamber.

The height or depth of cylinder block extension 36 matches the height of piston extension 34. The height is a compromise between that which is adequate for insulation of the combustion chamber near top dead center position of the piston where combustion gases are at the highest temperature, while being minimal enough to prevent an excess quantity of combustion air being lost in the gap between the piston and spacer or extension. This arrangement allows the piston rings 52 to operate on the water cooled cylinder wall so that conventional piston sealing techniques can be used. The cylinder block extension 36 constitutes a cylinder liner with an air gap A for heat insulation.

Finally, it will be seen that the cylinder head extension 38 is designed to prevent the flow of heat into the cylinder head coolant. The extension contains the valve seats and air gaps A between the combustion chamber 30 and the cylinder head body portion to permit the chamber surface to operate at a higher temperature. As stated previously, the prechamber throat or passage 28 is extended and insulated from the cylinder head with an air gap A to minimize heat loss in this high flow velocity area. The prechamber insert assembly also assists in locating the cylinder head extension. Additional heat insulated construction also can be applied to the exhaust port and manifold if desired to provide for elevated temperatures for continuing particulate oxidation.

While the invention has been shown and described in its preferred embodiment, it will be clear to those skilled in the arts to which it pertains that many changes and modifications may be made thereto without departing from the scope of the invention.

I claim:

1. A heat insulated combustion chamber for a diesel engine having a cylinder block member with a bore therein slidably receiving a piston member closing one end of the bore, a cylinder head member overlying the block member to cover the same and having a recess aligned with and cooperating with the bore and piston member to define a combustion chamber, and heat insulating spacer type extenders of ceramic material of substantial thickness and of low thermal conductivity secured to each of the piston member and cylinder block member and cylinder head member and extending axially from and interacting with the same to increase axial distances between normally adjacent surfaces for reducing outflow of heat from the combustion chamber into the piston member and block member and cylinder head member, a single bolt connecting the piston extender to the piston member, the extender of the cylinder block member and piston member having equal axial extents, the extender of the cylinder head member extending in a plane normal to the cylinder bore and above that of the extenders of the piston member and cylinder block member, and air gaps within each of the extenders extending over a substantial portion of the thickness thereof between the outer surfaces of the extenders and its respective member to which it is attached to reduce the available heat flow paths from the combustion chamber.

* * * * *